US006570862B2

(12) United States Patent
Virtanen

(10) Patent No.: US 6,570,862 B2
(45) Date of Patent: *May 27, 2003

(54) METHOD FOR SELECTING THE WAY TO PERFORM A HANDOVER, AND A CELLULAR RADIO SYSTEM

(75) Inventor: Anu Virtanen, Helsinki (FI)

(73) Assignee: Nokia Corporation, Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/029,513

(22) PCT Filed: Aug. 31, 1995

(86) PCT No.: PCT/FI95/00465
§ 371 (c)(1),
(2), (4) Date: Feb. 27, 1998

(87) PCT Pub. No.: WO97/08910
PCT Pub. Date: Mar. 6, 1997

(65) Prior Publication Data
US 2002/0085519 A1 Jul. 4, 2002

(51) Int. Cl.⁷ .................... H04B 7/216; H04Q 7/20
(52) U.S. Cl. .................. 370/335; 370/331; 455/436
(58) Field of Search ................. 370/335, 342, 370/320, 331; 455/436, 437, 440, 442, 446

(56) References Cited

U.S. PATENT DOCUMENTS

| 5,056,109 A | * | 10/1991 | Gilhousen et al. .............. 375/1 |
| 5,109,390 A | * | 4/1992 | Gilhousen et al. .............. 375/1 |
| 5,267,261 A | * | 11/1993 | Blakeney, II et al. ........... 375/1 |
| 5,268,933 A | * | 12/1993 | Averbuch ................... 375/107 |
| 5,402,451 A | | 3/1995 | Kaewell, Jr. et al. |
| 5,493,563 A | * | 2/1996 | Rozanski et al. .............. 370/50 |
| 5,517,675 A | * | 5/1996 | O'Connor et al. ......... 455/33.2 |
| 5,548,808 A | * | 8/1996 | Bruckert et al. ........... 455/33.2 |
| 5,551,057 A | * | 8/1996 | Mitra ........................ 455/33.1 |
| 5,577,022 A | * | 11/1996 | Padovani et al. .............. 370/13 |
| 5,594,718 A | * | 1/1997 | Weaver, Jr. et al. ........ 370/331 |
| 5,613,205 A | * | 3/1997 | Dufour ...................... 455/33.2 |
| 5,680,395 A | * | 10/1997 | Weaver, Jr. et al. ........ 370/331 |
| 5,697,055 A | * | 12/1997 | Gilhousen et al. .......... 455/33.2 |
| 5,703,873 A | * | 12/1997 | Ojanpera et al. ........... 370/332 |
| 5,926,470 A | * | 7/1999 | Tiedemann, Jr. ............ 370/334 |
| 5,945,948 A | * | 8/1999 | Buford et al. .............. 342/457 |

FOREIGN PATENT DOCUMENTS

| EP | 0 625 863 A2 | * | 11/1994 |
| WO | WO 93/21739 | | 10/1993 |
| WO | WO 95/12297 | | 5/1995 |
| WO | WO 97/08911 | * | 3/1997 |

* cited by examiner

Primary Examiner—Alpus H. Hsu
Assistant Examiner—Toan Nguyen
(74) Attorney, Agent, or Firm—Squire, Sanders & Dempsey L.L.P.

(57) ABSTRACT

The invention relates to a method for selecting a way to perform a handover in a cellular radio system, and a cellular radio system employing code division multiple access. The system comprises in each cell at least one base station transmitting a pilot signal, and subscriber terminal equipments that may be connected to one or more base stations simultaneously, said terminal equipments comprising means for measuring pilot signals received by them, and comprising means for performing handovers of at least two types. For saving the capacity and the resources of the system, the terminal equipment of the system in accordance with the invention comprises means for selecting, on the basis of the pilot signals it has received, the handover technique which is used on the connection between the terminal equipment and the base station each time.

11 Claims, 3 Drawing Sheets

METHOD FOR SELECTING THE WAY TO PERFORM A HANDOVER, AND A CELLULAR RADIO SYSTEM

FIELD OF THE INVENTION

The invention relates to a method for selecting a way to perform a handover in a cellular radio system employing code division multiple access, and comprising in each cell at least one base station transmitting a pilot signal, and a number of subscriber terminal equipments that may be simultaneously connected to one or more base stations, said terminal equipments measuring pilot signals received, and being capable of performing handovers of at least two types.

BACKGROUND ART

The present invention is suited to be used in radio systems utilizing code division multiple access, and in particular in so-called WLL (Wireless Local Loop) systems. Code Division Multiple Access, CDMA is a multiple access method, which is based on the spread spectrum technique, and which has been applied recently in cellular communication systems, in addition to the prior FDMA and TDMA methods. CDMA has several advantages over the prior methods, such as spectral efficiency and the simplicity of frequency planning.

In CDMA, the narrow-band data signal of the user is multiplied to a relatively wide band by means of a spreading code having a remarkably broader band than the data signal. Bandwidths used in known test systems are e.g. 1.25 MHz, 10 MHz and 25 MHz. In connection with the multiplication, the data signal spreads onto the whole of the band used. All users transmit simultaneously by using the same frequency band. An individual spreading code is used on each connection between the base station and the mobile station, and the signals of different users may be distinguished from each other in the receivers on the basis of the spreading code of each user.

Adapted filters in the receivers are synchronized with the desired signal, which is identified on the basis of the spreading code. The data signal is returned in the receiver onto the original band by multiplying it by the same spreading code as in connection with the transmission. The signals which have been multiplied by some other spreading code neither correlate nor return to the narrow band in an ideal case. They thus appear as noise from the point of view of the desired signal. It is endeavoured to select the spreading codes of the system so that they are not mutually correlated, in other words, they are orthogonal. In practice, the spreading codes are not non-correlated, and the signals of other users complicate the detection of the desired signal by distorting the received signal. This interference caused by the users for each other is termed as multiple access interference.

In several CDMA systems in accordance with the prior art, a so-called pilot signal is used, which is transmitted by each base station and utilized in identification of base stations, power measurement, and for enabling coherent reception in a mobile station. The pilot signal is a data unmodulated spreading coded signal, and it is transmitted to the coverage area of the base station in the same way as the actual traffic channels. The coverage area of the pilot signal in fact determines the size of the cell of the base station, since the terminal equipments utilize it in call establishment. The base stations continuously transmit the pilot signal, and the spreading codes used in the transmission of the pilot signal of different base stations differ from each other, so that a terminal equipment may identify the base stations on the basis of the pilot transmitted by them.

Systems in which a radio telephone network is used for replacing a conventional fixed telephone network are termed as WLL systems. In a WLL system, subscriber terminal equipments are fixed on the premises of the user, like a conventional telephone. In all data transmission methods utilizing a radio channel, interference occurs on the radio path, such as multipath fading of the signal, which is due to summing of such a signal in the receiver that has propagated several different ways. Since in a WLL system both the transmitter and the receiver are stationary, multipath fading is caused by the movements of the objects located in the surroundings. Thus, radio technically speaking, fading is very slow. A fading period usually varies from one second to a few seconds. Moreover, the fading depths may be so remarkable that they have an effect on the quality of the connection, in particular if the subscriber terminal equipment is located in the peripheral area of two cells.

A terminal equipment located in a peripheral area may meet with a situation in which a signal received from its own base station is fading just when a signal arriving from an adjacent base station is several decibels stronger than the desired signal. The signal-to-interference ratio of the signal received from its own base station, i.e. the quality of the connection may then decrease significantly. It is thus necessary to use a handover method of some kind between different base stations in the peripheral areas of a cell, which also takes multipath fading into account.

Known cellular radio systems, such as GSM, employ so-called hard handover, in which the terminal equipment communicates only with one base station at a time. If the quality of the connection weakens, a handover is performed to a new base station, the signal received from which is stronger.

CDMA cellular radio systems usually employ so-called soft handover. In soft handover, the terminal equipment may simultaneously communicate with more than one base station during the handover. The base stations with which the terminal equipment may communicate are referred to as an active group. All the base stations with which the terminal equipment communicates transmit the same signal to the terminal equipment, which may select from said signals the strongest signal components, and advantageously combine them. The signal-to-interference ratio of the received signal may thus be maximized.

A parallel international application "Handover method and a cellular radio system" PCT/FI95/00467 discloses a method in which the terminal equipment directly controls the transmission power of the base stations during a soft handover. By means of the method, it is possible to switch only the necessary base stations of the active group to transmit the signal to the terminal equipment.

Known methods, however, are attended by numerous drawbacks. If a hard handover is employed in a WLL system, taking multipath fading into account, it may result in a so-called ping-pong phenomenon, in which the connection is continuously switched between two base stations. This causes relatively much signalling on the radio path.

The drawback of soft handover in the WLL system is that extra interference power may unnecessarily be sent onto the radio path. Since the fading process of the signals sent from different base stations is not correlated, the signal received from one base station may be at its strongest simultaneously when the signal received from another base station is fading.

If the fading is several decibels, the signal received from the latter base station is hardly of avail in the terminal equipment. Said signal, however, causes interference in the coverage area of said base station, and the capacity of the cell thus decreases. In conventional cellular radio systems, this problem is not relevant, as the fading processes are much faster. The disclosed situation may, however, last several seconds in the WLL system.

The method disclosed in a parallel international application "Handover method and a cellular radio system" PCT/FI95/00467 is well suited for a WLL environment if the fading dynamics is relatively high, and the need for handover does not arise too frequently. It must be taken into account in the WLL system, however, that different directions of transmission are processes independent of each other. If the power control commands in the uplink direction are sent to the terminal equipment on the basis of the best connection in the uplink direction, it may be the case that the base station the downlink signal received from which is the best, does not hear the signal in the uplink direction.

Each of the above mentioned handover methods has its drawbacks that waste capacity and resources if the same method is used in the whole system.

SUMMARY OF THE INVENTION

The aim of the present invention is to implement a method in which the handover solution most appropriate for each situation is selected, said solution wasting as little capacity and resources as possible.

This is achieved with a method of the type set forth in the introduction, which is characterized in that the terminal equipment makes, on the basis of the pilot signals received by it, the decision on the handover technique used on the connection between the terminal equipment and the base station each time.

The invention further relates to a cellular radio system employing code division multiple access, and comprising in each cell at least one base station transmitting a pilot signal, and a number of subscriber terminal equipments that may be simultaneously connected to one or more base stations, said equipments comprising means for measuring the pilot signals received by them, and comprising means for performing handovers of at least two types. The cellular radio system of the invention is characterized in that the terminal equipment of the system comprises means for selecting on the basis of the pilot signals received by it the handover technique which is used on the connection between the terminal equipment and the base station each time.

By means of the method of the invention, transmission and processing of extra data connected with conventional methods may be avoided. On the basis of the measurements of the pilot signals, the terminal equipment may find out in advance which handover technique is the most advantageous each time. The terminal equipment measures pilot signals during a time period the length of which is essentially greater than the fading period of the radio channel. In WLL systems, the measuring time period may be as long as a half an hour. By means of the measurements during the connection, the way to perform the handover may also be changed during the connection. In a preferred embodiment of the invention, the terminal equipment calculates the power difference between the weakest and the strongest signal of the pilot signals received by it. In addition, the terminal equipment calculates on the basis of the pilot signals measured by it what is the estimated time distribution of handovers when only hard handovers are performed.

On the basis of these parameters, the terminal equipment may conclude which handover technique is the most advantageous each time.

BRIEF DESCRIPTION OF THE DRAWINGS

In the following, the invention will be described in greater detail with reference to the examples in the attached drawings, in which.

THE PREFERRED EMBODIMENTS OF THE INVENTION

Figure 1:
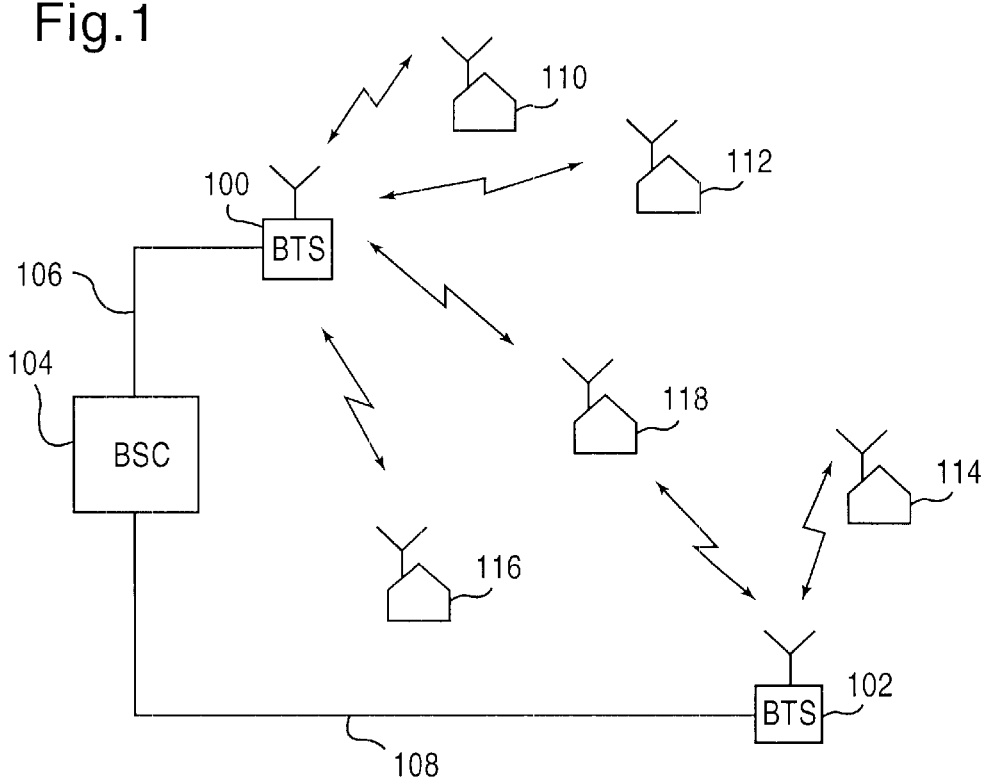
FIG. 1 shows a WLL system in which the method of the invention may be applied.

FIG. 1 shows a schematic picture of a WLL system in which the method of the invention may advantageously be applied. WLL systems refer to systems in which a radio telephone system is used for replacing a conventional fixed telephone network. In a WLL system, the subscriber terminal equipments are fixed on the premises of the user like a conventional telephone. The structure of the system is like that of a conventional cellular radio system. The exemplary system of FIG. 1 comprises two base stations 100, 102, which are connected via digital transmission links 106, 108 to a base station controller 104, and further to the other elements of the system, and to the fixed telephone network.

The system further comprises a number of subscriber terminal equipments 110–118, which are fixed e.g. in the dwelling of each user like a conventional telephone. The terminal equipments communicate over the radio path with the base stations, typically with the base station that provides the connection of the best quality. In the example of the figure, terminal equipments 110, 112 and 116 communicate with base station 100, and terminal equipments 114 and 118 with base station 102. Terminal equipment 118, however, is located in the boundary area of the coverage areas of base stations 100 and 102, and the probability of handovers is high, in particular when this terminal equipment is concerned. It must be noticed that in a real system the number of the terminal equipments is naturally essentially larger than in the example shown in FIG. 1. The CDMA system typically uses the same frequency band in all the base stations within the area, and the users are distinguished from each other by means of a pseudorandom sequence given to each user, the signal of each user being multiplied by said sequence.

Each base station 100, 102 transmits a pilot signal which is a data unmodulated signal, coded in advance with a previously known pseudorandom sequence, on the basis of which signal the terminal equipment may identify each base station. By measuring said signal it is possible to select the base station providing the best connection. In the case of the example in FIG. 1, terminal equipment 118 has the highest probability to encounter with a situation in which the signal coming from base station 102 is fading, but simultaneously, the signal coming from base station 100 is not fading, but it may be significantly stronger than the signal of base station 102.

In the solution in accordance with the invention, each terminal equipment thus measures pilot signals received by it, and decides on the basis of the measurements which handover technique would be the most advantageous for it on the following or the present connection. In a preferred embodiment of the invention, the terminal equipments do not necessarily continuously measure all pilot signals received by them, but only the ones that belong to a so-called active list, which contains the base stations that are worth performing a handover from the point of view of the terminal equipment. In practice, this refers to the nearest base stations. The terminal equipment measures the pilots of the active list for a sufficiently long time, i.e. remarkably longer than an average fading period, e.g. for a half an hour, and on the basis of the measurement, it makes the decision whether it wishes to use hard handover, soft handover, or soft handover in which part of the base stations may be turned off on the following connection.

In a preferred embodiment of the invention, the terminal equipment may calculate different parameters on the basis of the measurements. On the basis of said parameters, it is possible to evaluate the most advantageous handover technique.

The terminal equipment calculates on the basis of the measurements what would be the time distribution of time-slots $T_{slot}$ between successive handovers if the terminal equipment would perform hard handovers on the basis of the strengths of the pilot signals measured by it. In the WLL system, the size of the active list, i.e. the number of the base stations to be measured is most preferably 1–3 base stations. There are several alternatives for the criterium for performing a hard handover. One possibility is to always select the strongest pilot signal in terms of the power level. Another alternative is to select a pilot, the power level of which exceeds a certain threshold, and simultaneously, is not lower than any other pilot with a certain threshold value.

The terminal equipment further calculates, on the basis of the measurements, what is the distribution of the power difference $P_{diff}$ between the strongest and the weakest pilot signal in the active group measured in decibels. The fading is not averaged out when the distribution is calculated.

In the preferred embodiment of the invention, the terminal equipment makes, on the basis of the time-slot and power difference distributions, the decision on the desired handover technique for the following connection. The terminal equipment may naturally continue the measurements, and update the distribution results, and update the desired handover technique on the basis of the changed results if the conditions on the radio path change.

The decision on the handover technique may be made in several ways on the basis of the distributions. One preferred method is illustrated in the attached table. In accordance with the method, cumulative probability values $P_{cum1}$ ($P_{\_diff}$>5 dB) and $P_{cum2}$ ($P_{slot}$>1 s) of $T_{slot}$ and $P_{diff}$ are used in the decision-making. In addition, a cumulative probability parameter $P_{cum3}$ ($T_{slot}$>30 min) is determined for hard handover. Depending on the system, other parameter values than the exemplary values of the table are possible.

| $P_{cum1}$ ($P_{diff}$ > 5 dB), $P_{cum2}$ ($P_{slot}$ > 1 s) | $P_{cum3}$ ($T_{slot}$ > 30 min) | Handover technique |
|---|---|---|
| $P_{cum1}$ < 10% OR $P_{cum2}$ < 10% | — | Soft (1) |
| $P_{cum1}$ > 10% AND $P_{cum2}$ > 10% | <1% | Soft, part turned off (2) |
| $P_{cum1}$ > 10% AND $P_{cum2}$ = 100% | | Hard (3) |

Figure 2:
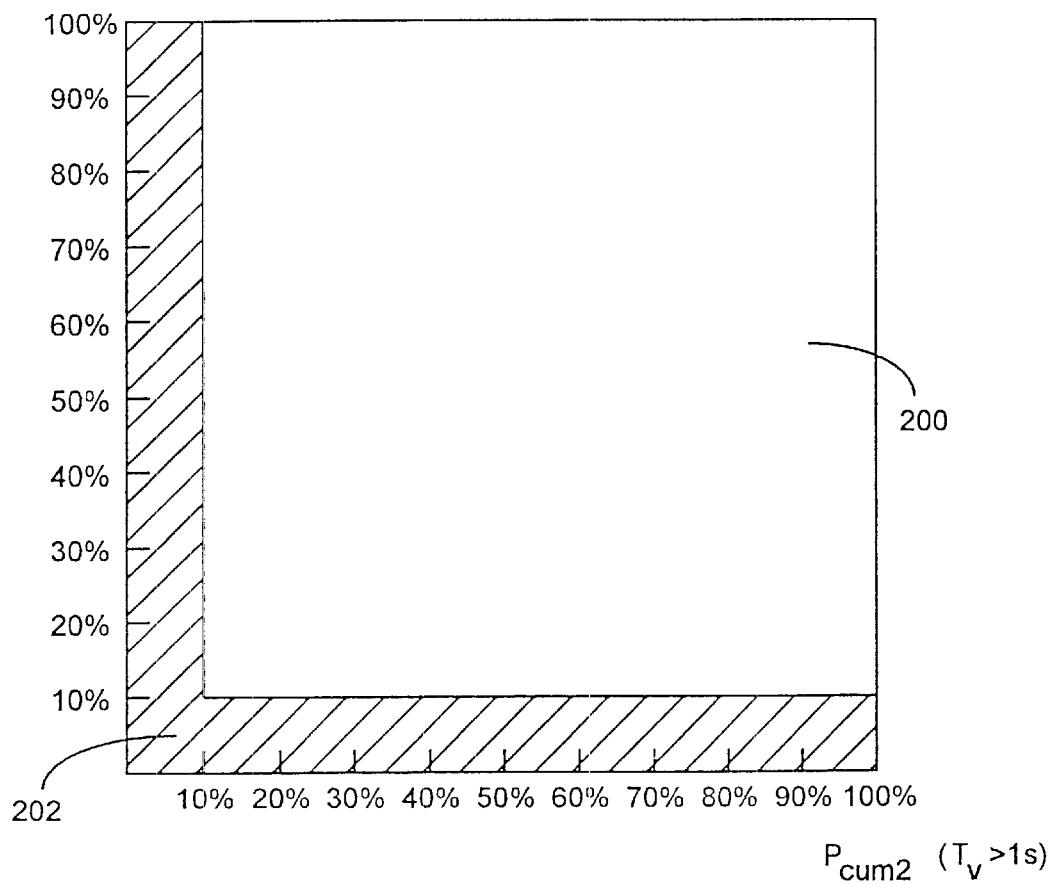
FIG. 2 illustrates in greater detail the criteria for the division into soft handover, and hard handover in which part of the base station are turned off.

FIG. 2 illustrates in greater detail the division into hard handover, and soft handover in which part of the base stations may be turned off. The unshaded area 200 in the figure shows a parametric area in which part of the base stations may be turned off, and the shaded area 202 shows a parametric area in which soft handover is performed. It must be noticed that the parameters shown in the figure are not intended to show the optimal parameter alternative, but only to illustrate the present invention. In accordance with the method, if the power difference between the strongest and the weakest pilot signal in the active group remains within the margin of 5 dB for the most of the time, or if the interval of successive handovers is smaller than one second for the most of the time, soft handover is thus used. If, again, the power difference between the strongest and the weakest pilot signal in the active group is above 5 dB for a relatively large part of the time, and the interval between successive handovers is sufficiently long, it is advisable to use soft handover in which part of the base stations may be turned off.

Hard handover may be selected in accordance with the example of the table when the interval between handovers is more than one second each time, and when there is a high probability (99%) that the interval is e.g. more than a half an hour.

When the terminal equipment next time wishes to send a call establishment message to the base station, it will send it to the base station that has the strongest pilot signal. In the call establishment message, the terminal equipment reports which handover technique it wishes to use on the connection to come. It may report this by using two bits (handover technique=1/2/3). In the call establishment message, the terminal equipment does not need to determine the active group, i.e. the list of the base stations it wishes to use in the handover. This is due to the fact that in the WLL system, the terminal equipment may have reported it already before, and said information is stored in the base station controller. If no changes occur in the surroundings, the terminal equipment always uses the same active group, and there is no need to transmit new information. If the situation has changed, however, the information on the new active group may be recorded in the base station controller in place of the old active group. The same applies to the frame phase difference between the base stations belonging to the active group. The WLL terminal equipment sends it once upon establishing a call, whereafter the information is recorded in the base station controller. After this, the terminal equipment sends the information on the frame phase difference only if the old information has changed.

In the following, let us study different handover techniques from the point of view of the invention. If the desired handover technique is soft handover (alternative 1 in the above table), the network will thus immediately establish a connection from all the base stations belonging to the active group of the terminal equipment to the WLL terminal equipment.

If the desired handover technique is hard handover (alternative 3 in the above table), the network will establish a call only via the base station to which the terminal equipment has sent a call establishment message. If a need for handover arises after this, which is probably rather unusual, conventional handover is used. If, however, it becomes apparent during the connection that the need for handover increases, the change of the handover technique may be signalled to the base station controller. If, for instance, the terminal equipment wishes to change over to use soft handover (handover technique 1), this information is signalled to the base station controller, which establishes a call via the base stations belonging to the active group to the terminal equipment.

If the desired handover technique is soft handover in which part of the base stations may be turned off (alternative 2 in the above table), the network will then immediately establish a call via all base stations belonging to the active group to the WLL terminal equipment. In other words, the call is started in the same way as in the case of conventional soft handover. Once the call has been established, the terminal equipment starts to transmit, in the uplink direction of transmission, selection symbols of the base station in each frame. By means of said symbols it determines which base stations it wishes to transmit in future. The terminal equipment may select either one base station or a desired number of base stations from the active group. In the selection, it may utilize an adaptive algorithm, which predicts fading processes of the pilot signals of the base stations. In the uplink direction of transmission, all base stations of the active group receive the same signal transmitted by the terminal equipment. The frames received by different base stations are combined in the base station controller, which also receives and interprets the selection symbols of the base stations frame by frame. The task of the base stations controller is to see to that the base stations determined by the selection symbols transmit the signal to the terminal equipment in the downlink direction of transmission. If a certain base station is to transmit in a downlink direction of transmission in accordance with the selection symbols, the base station controller transmits the frames to be transmitted to the base station, which sends them onto the radio path. If, in turn, the base station is to terminate the transmission, the base station controller no longer transmits frames to it.

It may be assumed that the description of the selection symbols of the base stations takes place e.g. so that when the terminal equipment at some point has sent the information on the active group to the base station controller, this list is used as a reference both at the terminal equipment and the base station controller. If the active group contains two base stations, for instance, the first base station is determined to be number 01 and the second one is determined in the active list as 10. If they are both to transmit in the downlink direction of transmission, selection symbols 11 are used.

By means of the above-described method it is thus possible to select the most advantageous handover technique for each connection. Transmission of extra data on the radio path, and processing in the transceivers may thus be minimized. If it is known in advance on the basis of the measurements, for instance, that handovers probably take place infrequently, it is advisable to establish the call so that the required handovers are performed by means of hard handover. The amount of interference power on the radio path is thus minimized, since the procedure does not remain in the state of soft handover, and neither are extra selection symbols transmitted in the frames.

Figure 3:
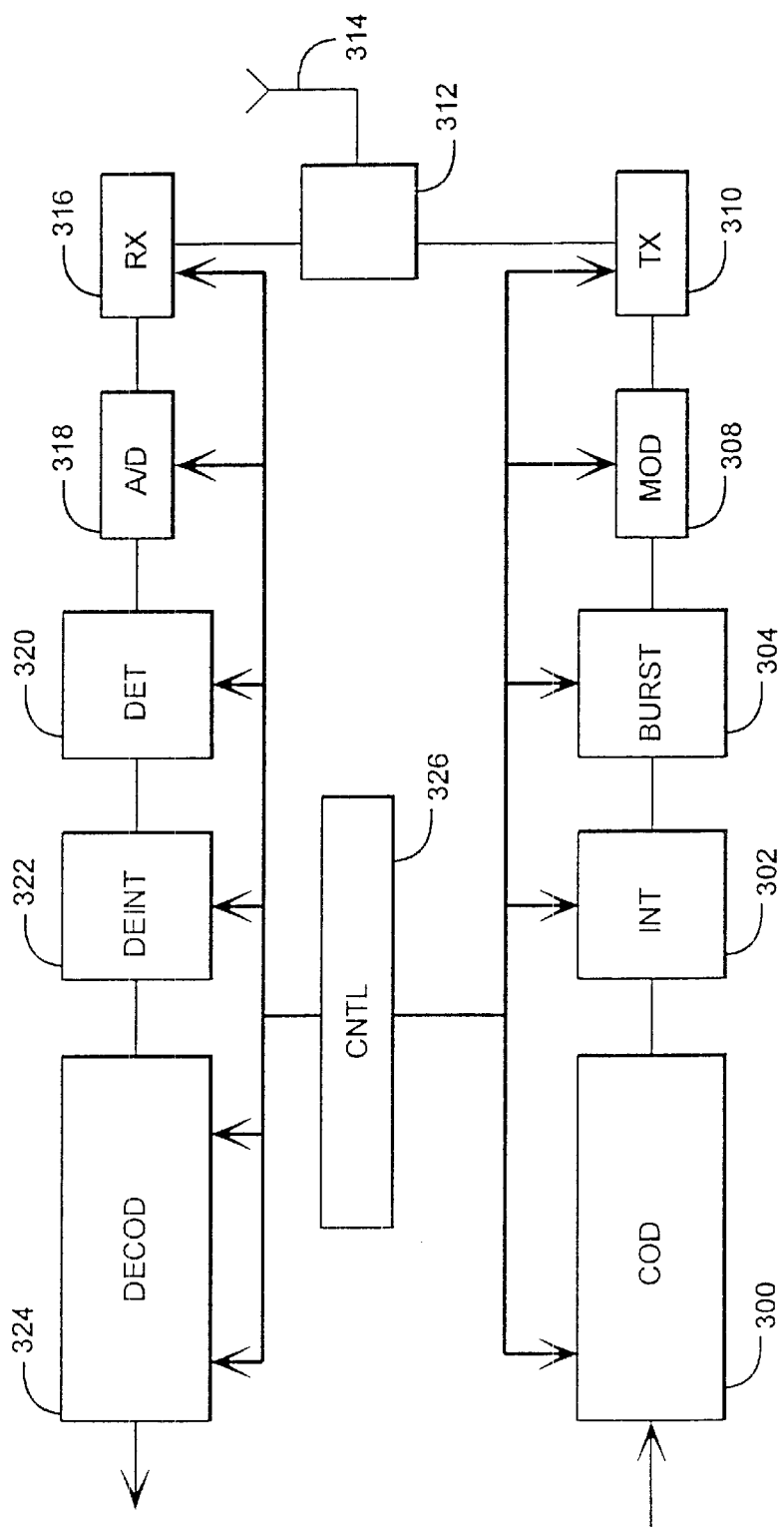
FIG. 3 is a block diagram illustrating the structure of the terminal equipment of the cellular radio system of the invention.

In the following, let us study one possible structure of the terminal equipment of the cellular radio system in accordance with the invention by means of the block diagram shown in FIG. 3.

The terminal equipment comprises means 300 for coding the signal to be transmitted, said means being used for applying the coded signal to means 302 for interleaving the coded signal. The output signal of the interleaving means is connected to the input of means 304, in which means the burst to be transmitted is formed. The thus obtained signal is applied to modulation means 308, the output signal of which is applied via a transmitter unit 310 and a duplex filter 312 to an antenna 314.

The terminal equipment further comprises in the direction of reception radio frequency elements 316, in which the signal received with the antenna 314 is converted onto an intermediate frequency, and converter means 318, in which the signal is converted into a digital form. The converted signal is applied to detection means 320, from which the detected signal is further applied to deinterleaving means 322 and means 324, in which the received signal is decoded, i.e. both channel and speech decoding are carried out. The apparatus further comprises control and calculation means 326, which control the operation of the other above-mentioned blocks. The control and calculation means are typically implemented by means of a processor. The terminal equipment naturally comprises other components than those shown in the figure, such as filters and converters, as is obvious to a person skilled in the art, but for clarity they are not shown in the figure.

The terminal equipment in accordance with the invention comprises means 316–320, 326 for receiving and measuring the pilot signals transmitted by the base stations belonging to the active group, and further means 326 for selecting on the basis of the pilot signals received by it, the handover technique used on the connection between the terminal equipment and the base station each time. The terminal equipment detects the pilot signals multiplied by known spreading codes and measures their strengths in the detection means 320, and transmits the required data to the control means 326 in which the required calculation of parameters is carried out for selecting the handover technique. The terminal equipment of the system further comprises means (326, 310) for transmitting the information on the selected handover technique to the base station.

Figure 4:
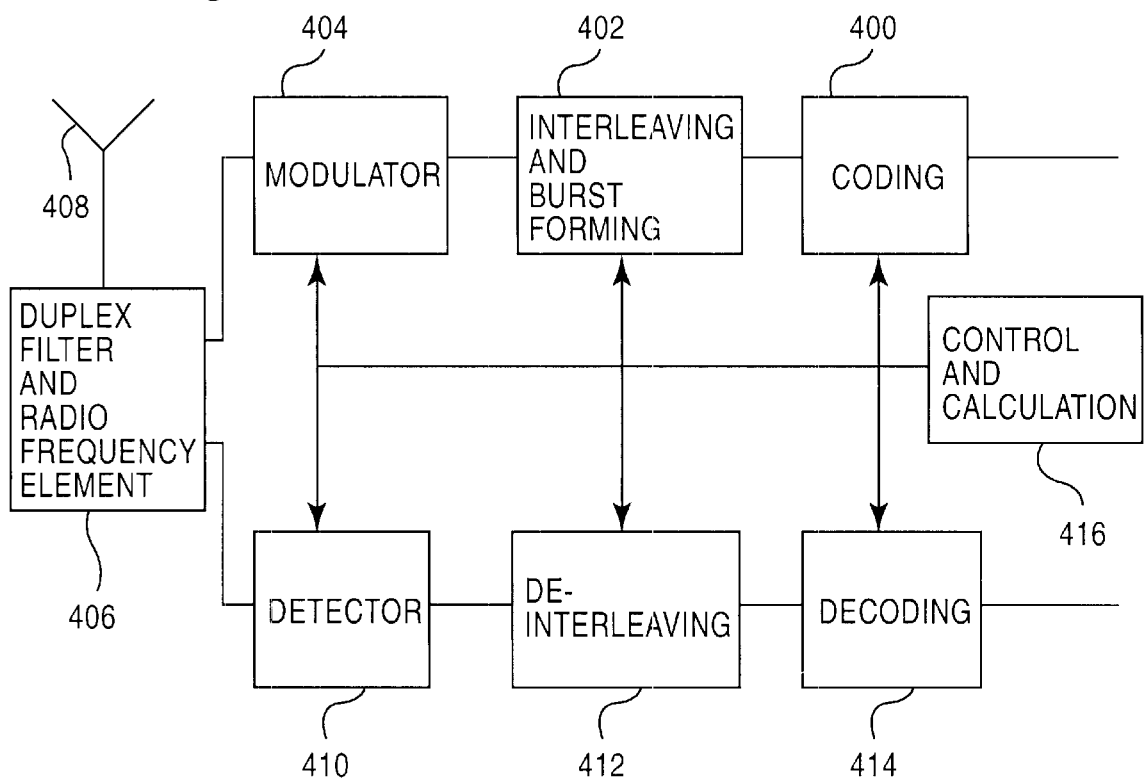
FIG. 4 is a block diagram illustrating the structure of the base station of the cellular radio system of the invention.

FIG. 4 illustrates the structure of the base station of the cellular radio system in accordance with the invention by means of a block diagram. The base station comprises means 400 for coding the signal to be transmitted, said coded signal being applied to means 402, in which interleaving and burst forming is carried out for the coded signal. The thus obtained signal is applied to modulation means 404, the output signal of which means is applied via radio frequency elements and a duplex filter 406 to an antenna 408.

The base station further comprises in the direction of reception detection means 410, in which the signal received with the antenna 408 and converted in the radio frequency elements 406 is detected. The detected signal is further applied to deinterleaving means 412 and means 414, in which the received signal is decoded, i.e. both channel and speech decoding is carried out. The apparatus further comprises control and calculation means 416, which control the operation of the other above-mentioned blocks. The base station further comprises means (412, 416) for receiving and recording the information on the selected handover technique.

Although the invention has been described above with reference to the example in accordance with the attached drawings, it is obvious that the invention is not limited thereto, but it may be modified in various ways within the scope of the inventive idea set forth in the attached claims.

What is claimed is:

1. A method for selecting a handover type in a cellular radio system employing code division multiple access, the method comprising:

transmitting a pilot signal by at least one base station in each cell;

connecting a plurality of subscriber terminal equipment to one or more base stations simultaneously;

measuring pilot signals received by the subscriber terminal equipment, the measuring pilot signals further comprising calculating, on a basis of pilot signals measured by the subscriber terminal equipment, what is an estimated time distribution between handovers when only hard handovers are performed; and performing handovers of at least two types, wherein the subscriber terminal equipment makes, on the basis of pilot signals received by the subscriber terminal equipment, a decision on the handover type to be used on a connection between the subscriber terminal equipment and the base station.

2. A method for selecting a handover type in a cellular radio system employing code division multiple access, the method comprising:

transmitting a pilot signal by at least one base station in each cell;

connecting a plurality of subscriber terminal equipment to one or more base stations simultaneously;

measuring pilot signals received by the subscriber terminal equipment during a time period, a length of which is substantially longer than a fading period of a radio channel; and performing handovers of at least two types, wherein the subscriber terminal equipment makes, on a basis of pilot signals received by the subscriber terminal equipment, a decision on a handover type to be used on a connection between the subscriber terminal equipment and the base station.

3. A cellular radio system employing code division multiple access comprising:

in each cell at least one base station transmitting a pilot signal; and a plurality of subscriber terminal equipment connected to one or more base stations simultaneously, the plurality of subscriber terminal equipment comprising:

means for measuring pilot signals received by the subscriber terminal equipment;

means for performing handovers of at least two types;

means for calculating, on a basis of pilot signals measured by the subscriber terminal equipment, an estimated time division between handovers when only hard handovers are performed; and means for selecting, on a basis of pilot signals received by the subscriber terminal equipment, a handover type to be used on a connection between the subscriber terminal equipment and the base station.

4. The method as claimed in claim 1, wherein measuring pilot signals further comprises calculating a distribution of a power difference between a strongest and weakest pilot signal received by the subscriber terminal equipment.

5. The method as claimed in claim 1, further comprising making a decision on the handover type prior to establishing a call.

6. The method as claimed in claim 5, wherein making the decision further comprises transmitting information by the subscriber terminal equipment on a selected handover type to the base station in a call establishment message.

7. The method as claimed in claim 5, further comprising transmitting by the subscriber terminal equipment information on a selected handover type by using a control channel during connection.

8. The method as claimed in claim 1, further comprising maintaining, by each subscriber terminal equipment, a list of base stations located near the subscriber terminal equipment, and measuring only pilot signals transmitted by base stations belonging to the list.

9. The cellular radio system as claimed in claim 3, wherein the subscriber terminal equipment further comprises means for calculating a distribution of a power difference of a strongest and weakest pilot signal received by the subscriber terminal equipment.

10. The cellular radio system as claimed in claim 3, wherein the subscriber terminal equipment further comprises means for transmitting information on a selected handover type to the base station.

11. The cellular radio system as claimed in claim 10, wherein the base station comprises means for receiving and recording the information on the selected handover type.

* * * * *